No. 861,251. PATENTED JULY 30, 1907.
E. F. BENNETT.
HINGE.
APPLICATION FILED AUG. 30, 1906.
Fig. 1.
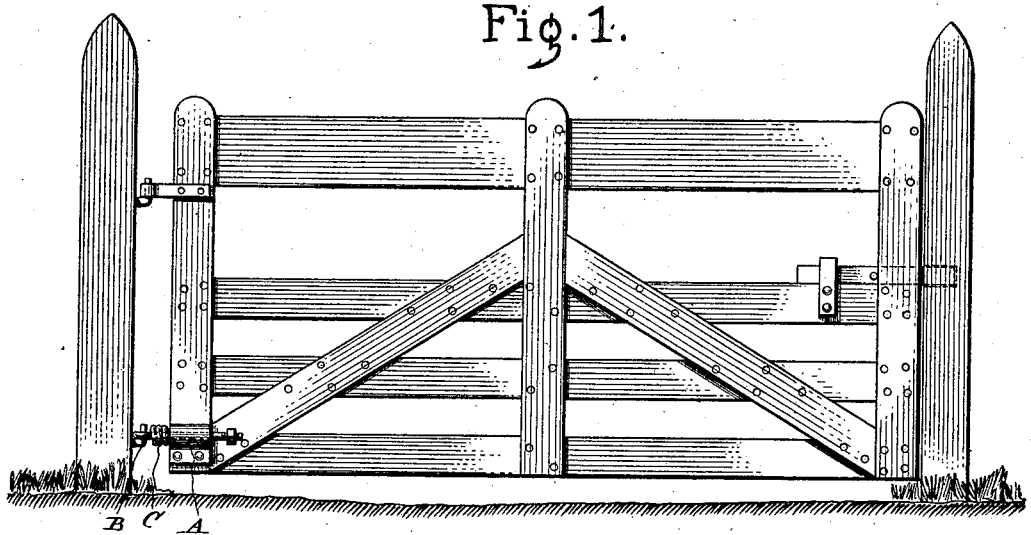
Fig. 2.
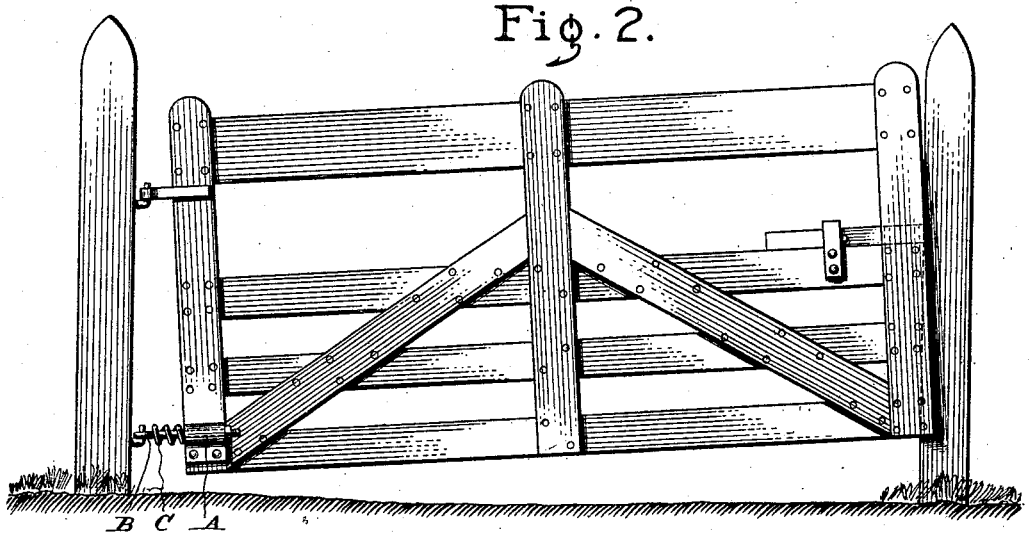
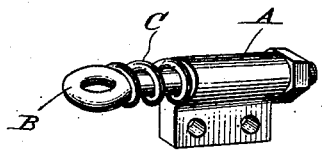
Fig. 3.
Witnesses:
E. N. Barr
M. P. Bennett
Inventor:
Edwin Fletcher
Bennett

UNITED STATES PATENT OFFICE.

EDWIN FLETCHER BENNETT, OF TOPEKA, KANSAS, ASSIGNOR OF ONE-HALF TO FRANK X. AARON, OF LANSING, KANSAS.

HINGE.

No. 861,251.         Specification of Letters Patent.         Patented July 30, 1907.

Application filed August 30, 1906. Serial No. 332,700.

*To all whom it may concern:*

Be it known that I, EDWIN FLETCHER BENNETT, a citizen of the United States, residing at Topeka, in the county of Shawnee and State of Kansas, have invented a new and useful Improvement in Hinges, of which the following is a specification.

The invention relates to hinges for farm and other gates and as well for heavy doors and the like, it being especially adapted for use in connection with large and heavy gates, doors, and the like, where there is a tendency toward sagging, loosening of the post, or frame, tearing away and breaking of the hinges, etc.

Objects are: to improve generally upon hinges adapted especially for use upon such gates, doors, and the like; to provide a hinge which will prevent the gate or door from sagging and dragging on the ground; to provide a hinge which will raise the door or gate up above the ground and floor, especially above the uneven ground, or the mud, or the like, while it is swung around; to provide such a hinge in which the extent of the elevation may be adjusted; to provide such a hinge which will take up the shocks to which the door or gate may be subjected, as by rough handling, or by horses or other animals rubbing against it, or by undue bearing down upon it, so as to counteract or compensate for the tendency to loosen the post or frame or tear the gate or door from its bearings.

The invention consists of the parts, improvements, and combinations herein described and claimed.

In the drawings accompanying and forming part of this specification, and in the description thereof, I have shown my invention in its preferred form, and have also shown the best mode of applying the principles thereof; but it is to be understood that the invention itself is not confined to the exact drawings and description of the drawings; and that I contemplate changes in form, proportions, materials, the transposition of parts, and the substitution of equivalent members, within the scope of the appended claims, without departing from the spirit of the invention.

Figure 1 is an elevation view of an ordinary large farm gate hung on a common hook-and-eye hinge at the top and on my improved hinge at the bottom, the gate being shown as closed and locked between the posts by any suitable means as by the familiar bar. Fig. 2 is a similar view, but with the gate unlatched, and showing how the gate is raised by the spring in my hinge. Fig. 3 is a detached view of the female member of the improved hinge.

Like reference letters indicate like or corresponding parts throughout the several views.

I have shown my invention applied to the ordinary hook-and-eye hinge, of which the hook or male member is fastened to the gate post in the ordinary manner. The eye or female member B is provided with a rod which works through a bearing A, and this bearing is preferably quite long, as several inches long for an ordinary farm gate; at the other end of the rod is a nut; and between the eye and the bearing is a compression spring C. The bearing member A is secured to the gate. If, now, the gate being closed as in Fig. 1, and the gate be unduly borne down upon, as by being rubbed by a horse or other animal, or as when climbed over by persons, or otherwise, it will simply bear down against the ground against the tension of the spring C, whereas, if it were not for this spring, the extra weight would have to be carried by the post with the result of the tendency, as above stated, of loosening the post, or tearing or breaking the hinges. And yet as soon as the gate is relieved of this undue load, the spring elevates it again. If the gate be unlatched, as in Fig. 2, the spring raises the gate as far as the tension of the spring, limited by the nut, will permit, so that as it is swung upon its hinges, it may ride clear of the ground, mud, humps, or other obstructions; and even while open if subjected to any undue burden the shock will be absorbed chiefly by the spring, which will also again raise it clear of the ground when relieved of the burden. The extent to which the gate will be elevated may be nicely adjusted by the nut on the rod. And in case the spring becomes too weak, it may be readily replaced. Obviously the top hinge should be of such type as to allow of the slight vertical movement of the gate. Any suitable material may be used, but I prefer to make the hook, eye, rod, and bearing of malleable iron.

What I claim is:

1. A hinge comprising the combination with a hook member adapted to be secured to the gate-post or frame, and an eye member; of a rod forming an extension of the eye member, an elongated bearing for said rod, a compression spring coiled around said rod and having its bearings against said eye and said bearing member, and an adjusting nut on the rod on the other side of the bearing member, said bearing member being adapted to be secured to the swinging gate or door.

2. A hinge comprising the combination with a hook member and an eye member, of a rod forming an extension of the eye member, an elongated bearing for said rod, and a compression spring between the eye and the bearing member.

3. A hinge comprising the combination with the hook member and the eye member; of a rod forming an extension of one of said members, a bearing member for said rod, and a compression spring between said bearing member and the hinge member of which said rod forms an extension.

4. A hinge comprising the combination with the hook member and the eye member; of a rod forming an extension of one of said members, a bearing for said rod, a compression spring between the bearing and the hinge member of which the rod forms an extension, and an adjusting nut for limiting the expansion of the spring.

5. A hinge comprising the combination with the two pivoted hinge members, a bearing through which one of said members is adapted to move longitudinally, a compression spring between said bearing and the pivotal point of the hinge, and means for limiting and adjusting the expansion of the spring.

In testimony whereof I have signed my name to this specification in the presence of two subscribing witnesses.

EDWIN FLETCHER BENNETT.

Witnesses:
G. H. WOODHULL,
M. A. BENNETT.